May 21, 1963
G. G. WARD
3,090,449
LIFT FOR AGRICULTURAL IMPLEMENT
Filed Dec. 26, 1961
3 Sheets-Sheet 1
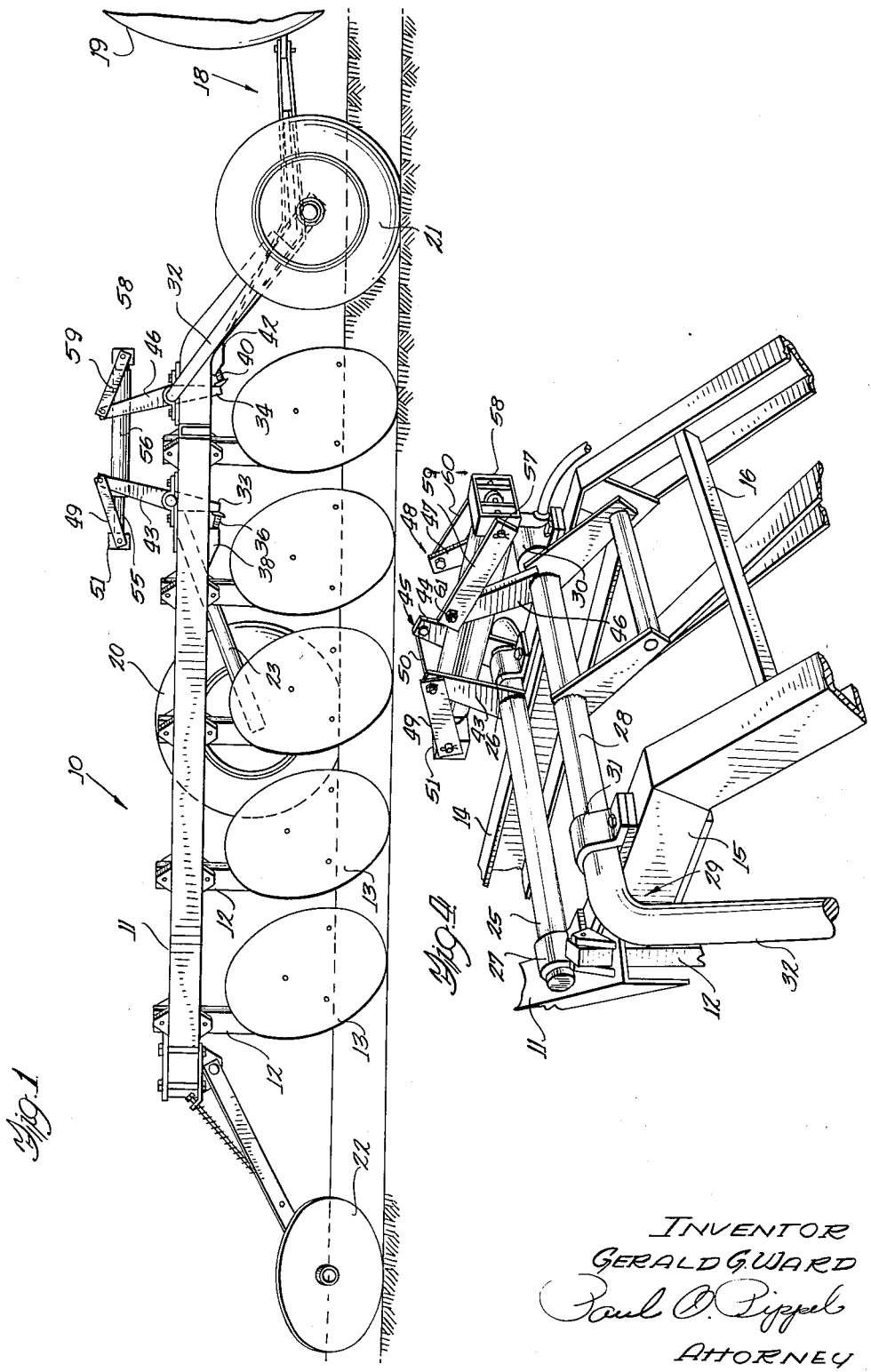
INVENTOR
GERALD G. WARD
Paul O. Pippel
ATTORNEY

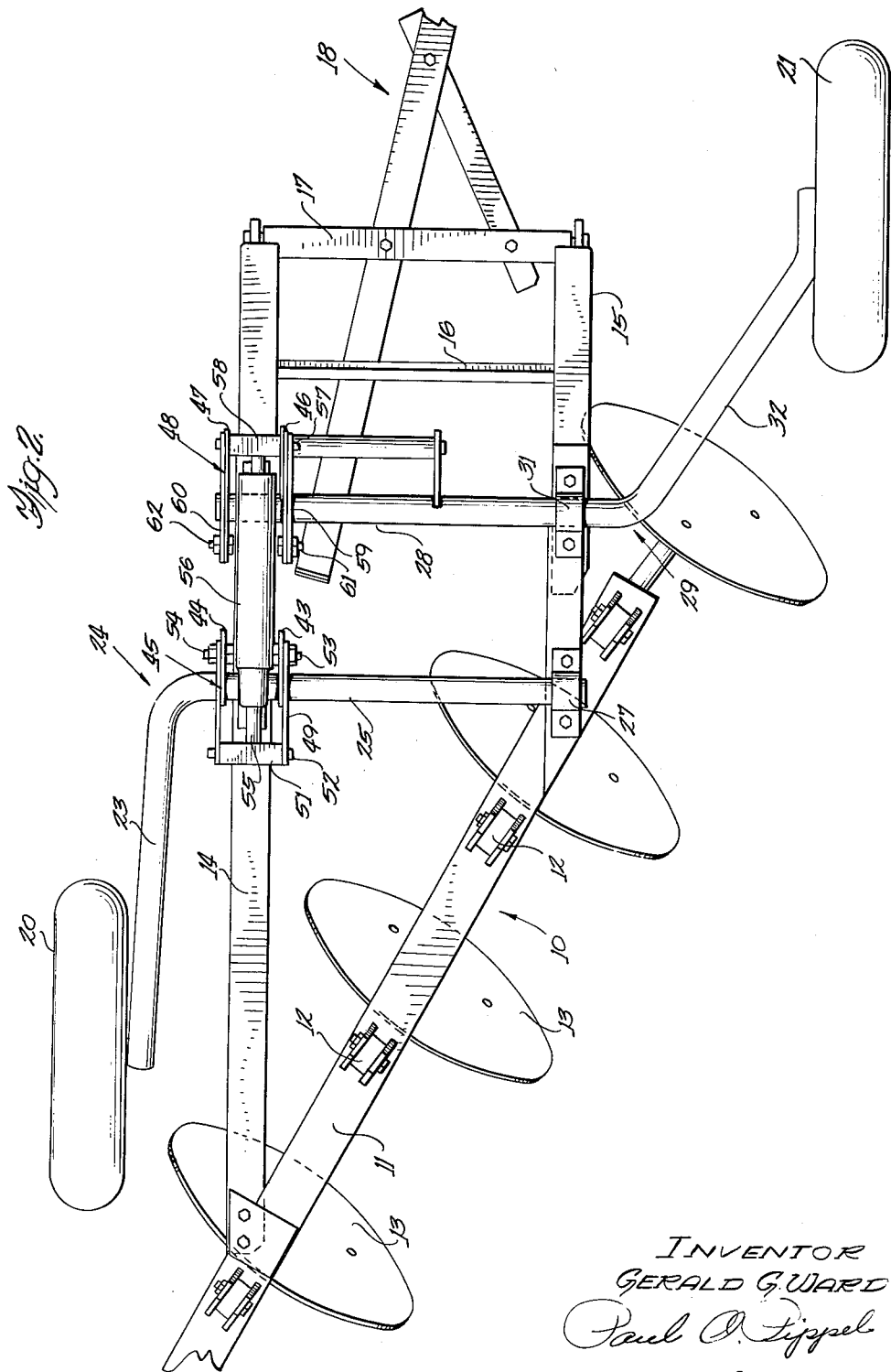

May 21, 1963
G. G. WARD
3,090,449
LIFT FOR AGRICULTURAL IMPLEMENT
Filed Dec. 26, 1961
3 Sheets-Sheet 3
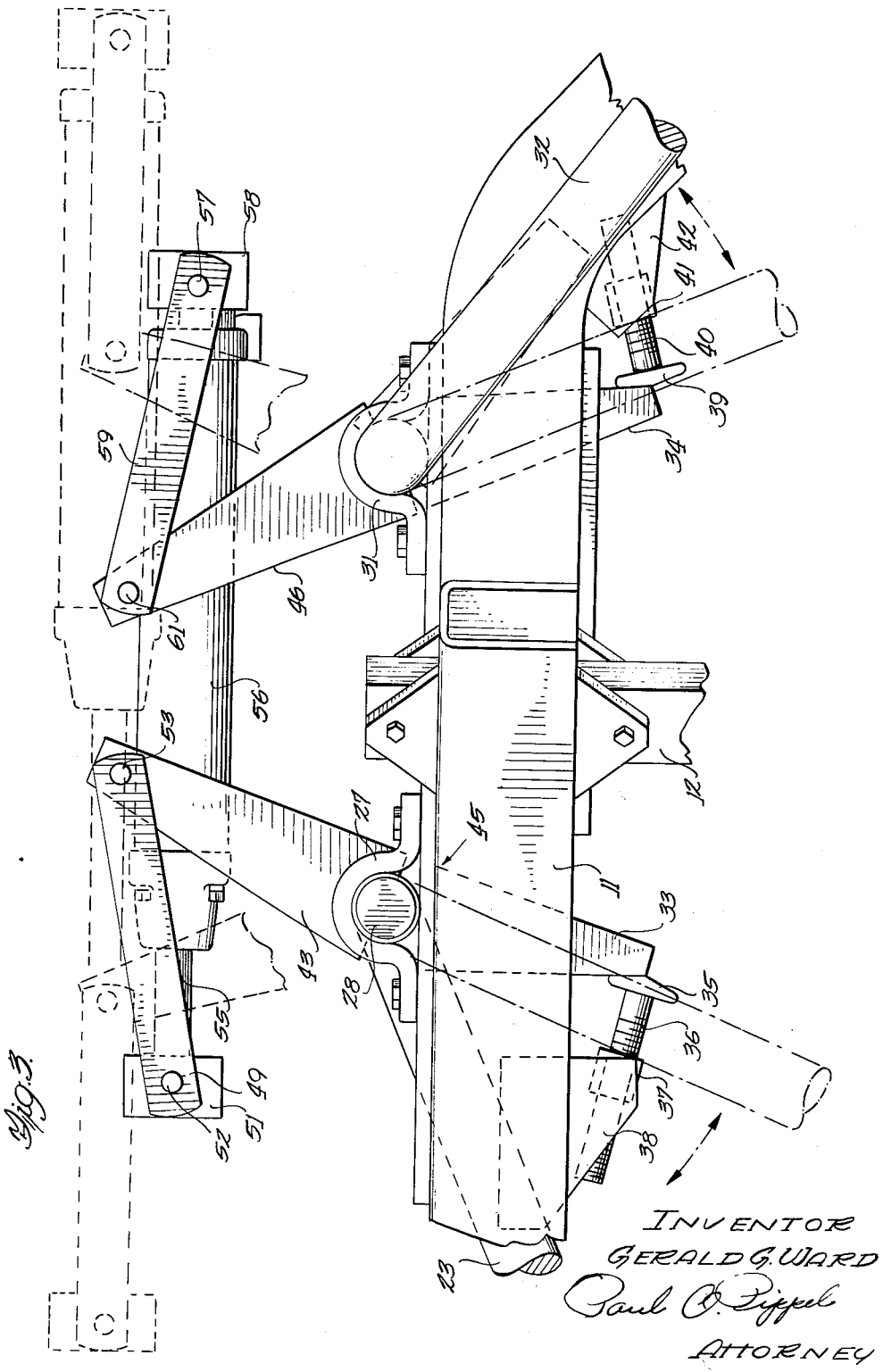
INVENTOR
GERALD G. WARD
Paul O. Pippel
ATTORNEY

United States Patent Office 3,090,449
Patented May 21, 1963

3,090,449
LIFT FOR AGRICULTURAL IMPLEMENT
Gerald G. Ward, Naperville, Ill., assignor to International Harvester Company, Chicago, Ill., a corporation of New Jersey
Filed Dec. 26, 1961, Ser. No. 162,129
3 Claims. (Cl. 172—316)

This invention relates to agricultural implements and particularly to an implement of the trailing type adapted to be propelled by a tractor or the like.

An object of the invention is the provision of an improved means for controlling the operation of a tractor propelled implement such as a disk plow.

Another object of the invention is the provision of novel raising and lowering means for a trail behind implement.

Another object of the invention is the provision, in a trail behind implement such as a disk plow supported by a pair of wheels, of novel control means on the implement for transmitting lifting power directly to both wheels to raise and lower the plow frame.

Other objects and advantages of the invention will become clear from the following detailed description when read in conjunction with the accompanying drawings wherein:

FIGURE 1 is a view in side elevation of a disk plow embodying the features of this invention;

FIGURE 2 is a plan view, on an enlarged scale, of a portion of the structure shown in FIGURE 1;

FIGURE 3 is an enlarged detail in side elevation of a portion of the structure shown in FIGURE 1, and;

FIGURE 4 is a view in perspective of the novel raising and lowering apparatus of this invention.

Referring to the drawings, the plow frame 10 of this invention includes a beam 11 extending diagonally of the direction of travel of the plow and having mounted thereon and depending therefrom, spaced standards 12 to the lower ends of which are secured plow disks 13. Also secured to beam 11 at their rear ends and extending forwardly therefrom are laterally spaced frame bars 14 and 15 connected by a cross brace 16, and at their downwardly bent forward ends by a pivoted hitch bar 17. A draft structure 18 connects the implement to a tractor indicated at 19.

The frame 10 is supported by a land wheel 20 and a furrow wheel 21, and the rear end of diagonal beam 11 carries a rear furrow wheel 22. Wheel 20 is adapted to ride upon the unplowed ground and is carried at the end of the arm section 23 of a crank axle 24 having a horizontal axle section 25 bent generally at right angles thereto and rockably mounted in bearings 26 and 27 secured to frame members 14 and 15, respectively.

Spaced forwardly of and parallel to axle section 25 of crank axle 24 is the horizontal axle section 28 of another crank axle 29, rockably mounted in bearings 30 and 31 secured to frame members 14 and 15, respectively. Crank axle 29 has a wheel-carrying bent section 32 upon the end of which furrow wheel 21 is mounted.

In FIGURES 1 and 2 the parts are shown in the implement's operating position. In this position, it will be observed that the furrow wheel 21 on the right-hand side of the plow frame extends forwardly of the axis of axle section 28 while land wheel 20 and crank arm 23 extend rearwardly of the axis of axle section 25. In order to limit the upward swinging of wheel carrying arms 23 and 32 relative to frame 10 and thus limit the depth of penetration of disks 13, the axles 25 and 28 have affixed thereto and depending therefrom, arms 33 and 34, respectively. Arm 33 engages the head 35 of a bolt 36 threaded into a block 37 secured to a lug 38 affixed to frame member 14. Arm 34 abuts the head 39 of a bolt 40 threaded into a block 41 secured to a lug 42 affixed to frame member 14. Adjustment of bolts 36 and 40 in the respective threaded blocks 37 and 41 regulate the depth of plowing by limiting the relative vertical movement between the wheels 20 and 21 and frame 10.

By the arrangement shown in the drawings it is possible to place the axles 25 and 28 relatively close together on the plow frame and raise and lower the latter relative to the wheels by a simple, economical and efficient lifting apparatus now to be described.

A pair of upwardly extending arms 43 and 44 are affixed to the left-hand end of axle section 25 of crank axle 24, arm 43 being disposed inwardly of and arm 44 outwardly of bearing 26, arm 44 being a companion arm with arm 33 and forming part of a bellcrank 45.

On axle section 28 of crank axle 29 a pair of arms 46 and 47 are affixed and oppositely disposed with respect to arms 43 and 44 on axle section 25. Arm 47 forms with arm 34 a bellcrank 48.

A pair of rearwardly extending links 49 and 50 are pivotally connected at their forward ends to the upper ends of arms 43 and 44, and their rear ends to a swivel member 51 through the intermediary of a pivot pin 52, the forward connection of link 49 being made to arm 3 by a bolt 53, and a pivot bolt 54 forms the connection between link 50 and arm 44.

A piston rod 55 is pivotally mounted upon pin 52 and is slidably receivable in a preferably one-way cylinder 56, which is pivotally anchored to a pin 57 carried by a swivel 58 to which are also connected, through pivot pin 57, the forward ends of a pair of links 59 and 60, the rear ends of which are connected by pivot bolts 61 and 62 to the upper ends of arms 46 and 47, respectively. Cylinder and piston unit 55, 56 is thus suspended in a cradle formed by the links 49, 50, 59, 60, and swivels 51 and 58 depending from rock arms 43, 44 and 46, 47. This arrangement makes it possible to use a standard sized cylinder acting between the crank axles 24 and 29 to rock them and swing the wheels 20 and 21 to raise and lower the tool frame.

In the drawings, the implement is shown in its operating position with wheels 20 and 21 extending in opposite directions and with the cylinder and its suspending linkage in relaxed condition. Fluid under pressure is supplied to the cylinder 56 by any suitable means, not shown, preferably from a source on the tractor 19, to extend the piston rod 55 to rock the arms 43, 44 and 46, 47 in opposite directions, arms 43, 44 being rocked rearwardly and arms 46, 47 being rocked forwardly to swing wheel carrying crank arms 23 and 32 downwardly into a position approaching transverse alignment, at which time the links 49, 50 and 59, 60 are in substantial alignment with each other and with the cylinder and piston unit 55, 56, as indicated in dotted lines in FIGURE 3, and the earthworking disks 13 have been elevated above the ground to a transport or non-operating position. By simply releasing the fluid in the cylinder 56, the plow may be returned to its operating position by its own weight.

The novel implement lifting and control apparatus of this invention should be clearly understood from the foregoing description. It should likewise be understood that the invention has been described in its preferred embodiment only, and that modifications may be made therein without departing from the spirit of the invention or the scope of the appended claims.

What is claimed is:

1. In an implement attachment for a tractor having a source of fluid under pressure, a tool-carrying frame having means thereon for connection to the tractor in draft-receiving relation, a pair of crank axles having longitudinally spaced parallel axle sections rockably mounted on the frame and wheel-carrying arm sections on opposite sides of the frame, said arm sections being swingable upon rocking said axle sections relative to the frame to raise and lower the latter, a rockable member affixed to each axle section, a one-way hydraulic power unit extending between said rockable members including a cylinder pivotally connected to one of said rockable members and a piston rod pivotally connected to the other, said rod being extendible under pressure of fluid received from said source to rock said rockable members in opposite directions to raise the frame and retractable upon release of the pressure on the fluid to lower the frame and stop means on the frame engageable with said rockable members after a predetermined retraction of said piston rod to limit the extent to which the frame can be lowered.

2. The invention set forth in claim 1, wherein each of said rockable members includes a pair of arms, one of which is connected to said power unit and the other of which is engageable with said stop means.

3. In an implement attachment for a tractor, a tool-carrying frame having means thereon for connection to the tractor in draft-receiving relation, a pair of crank axles having longitudinally spaced parallel axle sections rockably mounted on the frame and respective rearwardly and forwardly bent wheel-carrying arm sections on opposite sides of the frame, said arm sections being swingable in opposite directions forwardly and rearwardly by the rocking of said rock shaft to move said wheels from a working position with said wheels spaced apart longitudinally to a transport position with the wheels in generally transverse alignment, and means for rocking said axle sections including a pair of rock arms affixed to each of said axle sections, a pair of links pivoted to the arms of each pair and extending respectively in opposite directions therefrom, a swivel member connecting each pair of links, and an extensible member comprising a hydraulic cylinder anchored to one of said swivel members and having a piston rod slidable therein and pivotally connected to the other of said swivel members for transmitting motion therethrough to rock said rock arms.

References Cited in the file of this patent

UNITED STATES PATENTS

| | | |
|---|---|---|
| 1,285,900 | Bartholomew | Nov. 26, 1918 |
| 1,453,944 | Pedroarena | May 1, 1923 |